| (12) | United States Patent | (10) Patent No.: | US 7,637,469 B2 |
|---|---|---|---|
| | Yamada et al. | (45) Date of Patent: | Dec. 29, 2009 |

(54) SEAT SLIDING APPARATUS FOR A VEHICLE

(75) Inventors: Yukifumi Yamada, Toyota (JP); Yasuhiro Kojima, Kariya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 256 days.

(21) Appl. No.: 11/545,582

(22) Filed: Oct. 11, 2006

(65) Prior Publication Data

US 2007/0090263 A1    Apr. 26, 2007

(30) Foreign Application Priority Data

Oct. 24, 2005    (JP)    ............................. 2005-308089

(51) Int. Cl.
*F16M 13/00*    (2006.01)

(52) U.S. Cl. ............... 248/430; 248/240.2; 248/288.31; 248/288.51

(58) Field of Classification Search ................. 248/240, 248/240.2, 276.1, 279.1, 286.1, 288.31, 288.51, 248/354.1, 917, 920–922
See application file for complete search history.

(56) References Cited

U.S. PATENT DOCUMENTS

| 6,427,962 B1 * | 8/2002 | Rohee et al. ................. 248/424 |
|---|---|---|
| 6,688,574 B2 * | 2/2004 | Okazaki et al. ............. 248/424 |
| 6,923,415 B2 * | 8/2005 | Yokoi et al. ................. 248/424 |
| 7,318,573 B2 * | 1/2008 | Yamada et al. .............. 248/424 |
| 2002/0060281 A1 * | 5/2002 | Okazaki et al. ............. 248/424 |

FOREIGN PATENT DOCUMENTS

| CN | 1616272 A | 5/2005 |
|---|---|---|
| JP | 2002-154356 A | 5/2002 |

OTHER PUBLICATIONS

Office Action issued in corresponding Chinese Patent Application dated Apr. 10, 2009 with English Translation.

* cited by examiner

*Primary Examiner*—J. Allen Shriver, II
*Assistant Examiner*—Erin Smith
(74) *Attorney, Agent, or Firm*—Buchanan Ingersoll & Rooney PC

(57) ABSTRACT

A seat sliding apparatus includes a lower rail, an upper rail fixed to a vehicle seat and mounted on the lower rail to move, a lock mechanism having a lock lever for locking the upper rail with the lower rail, a slide supporting member disposed between the rails, a sliding portion provided at both the rails, with which the slide supporting member contact, lock portions provided at one of the rails facing each other, another lock portion provided at the other one of the rails locating between the lock portions, the lock lever being fitted into at least one of the lock portions. The sliding portion of the upper rail is formed along a longitudinal direction over an entire length of the upper rail and the lock portions of the upper rail are arranged at one of an upper side and a lower side of the sliding portion.

19 Claims, 8 Drawing Sheets

US 7,637,469 B2

SEAT SLIDING APPARATUS FOR A VEHICLE

CROSS REFERENCE TO RELATED APPLICATIONS

This application is based on and claims priority under 35 U.S.C §119 with respect to Japanese Patent Application 2005-276461, filed on Sep. 22, 2005, the entire content of which is incorporated herein by reference.

FIELD OF THE INVENTION

The present invention relates to a seat sliding apparatus for a vehicle.

BACKGROUND

A known seat sliding apparatus, as disclosed in JP2002-154356A, includes a lower rail fixed to an upper surface of a vehicle floor, an upper rail fixed to a lower surface of a seat of the vehicle and mounted on the lower rail for forward and backward movement, a lock mechanism having a lock lever for releasably locking the upper rail to the lower rail, and slide supporting members (ball units) disposed between the upper rail and the lower rail to support both of the rails in a way that the upper rail slides along the lower rail.

As illustrated in FIG. 4 of JP2002-154356A, a lock portion is formed at a longitudinally center portion at one side portion of the upper rail, a lock portion into which the lock lever is fitted in an engaged and disengaged manner. The sliding portions are provided at both sides of the longitudinally center portion of the upper rail in a way that the slide supporting members come in contact with the sliding portions.

In other words, the sliding portions and the lock portion are arranged at the upper rail in series along the longitudinal direction.

In the seat sliding apparatus described above, it is necessary that an entire length of the upper rail and the lower rail needs to be longer by a length of the lock portion than a sliding length of the upper rail on the lower rail because the sliding portions and the lock portion are arranged at the upper rail in series along the longitudinal direction. Furthermore, as it is clearly illustrated in FIG. 5 and FIG. 6 of JP2002-154356A, the cross sectional shape of the upper rail is changed at the boundary between the sliding portions and the lock portion, resulting in difficulty in production.

The present invention has been made in view of the above circumstances, and provides a seat sliding apparatus for a vehicle, which is produced easily and achieves high mechanical strength even shortening the length of the upper rail and the lower rail.

SUMMARY OF THE INVENTION

According to an aspect of the present invention, a seat sliding apparatus for a vehicle includes a lower rail fixed to a stationary portion of a vehicle floor, an upper rail fixed to a seat of the vehicle and mounted on the lower rail so as to move relative to the lower rail, a lock mechanism having a lock lever for releasably locking the upper rail with the lower rail, a slide supporting member disposed between the upper rail and the lower rail and supporting both of the upper and lower rails to slide, a sliding portion provided at both of the upper rail and the lower rail, the sliding portion with which the slide supporting member slidably comes in contact, a first lock portion and a second lock portion provided at one of the upper rail and the lower rail, the first lock portion and the second lock portion facing each other, a third lock portion provided at the other one of the upper rail and the lower rail and located between the first lock portion and the second lock portion, the lock lever being engageably and disengageably fitted into at least one of the first, second and third lock portions, the sliding portion of the upper rail being formed along a longitudinal direction over an entire length of the upper rail, and the first, second and third lock portions of the upper rail being arranged at one of an upper side and a lower side of the sliding portion.

According to another aspect of the present invention, a seat sliding apparatus for a vehicle includes a lower rail fixed to a stationary portion of a vehicle floor, an upper rail fixed to a seat of the vehicle and mounted on the lower rail so as to move relative to the lower rail, a lock mechanism having a lock lever for releasably locking the upper rail with the lower rail, a slide supporting member disposed between the upper rail and the lower rail and supporting both of the upper and lower rails to slide, a sliding portion provided at both of the upper rail and the lower rail, the sliding portion with which the slide supporting member slidably comes in contact, a first lock portion provided at one of the upper rail and the lower rail, a second lock portion provided at the other one of the upper rail and the lower rail facing the first lock portion, the lock lever being engageably and disengageably fitted into at least one of the first, second portions, the sliding portion of the upper rail being continuously formed along a sliding direction of the upper rail, and the lock portions of the upper rail being arranged at one of a portion on the upper rail and a portion on the lower rail relative to the sliding portion.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Embodiments of the present invention will be described below with reference to the attached drawings.

Figure 1:
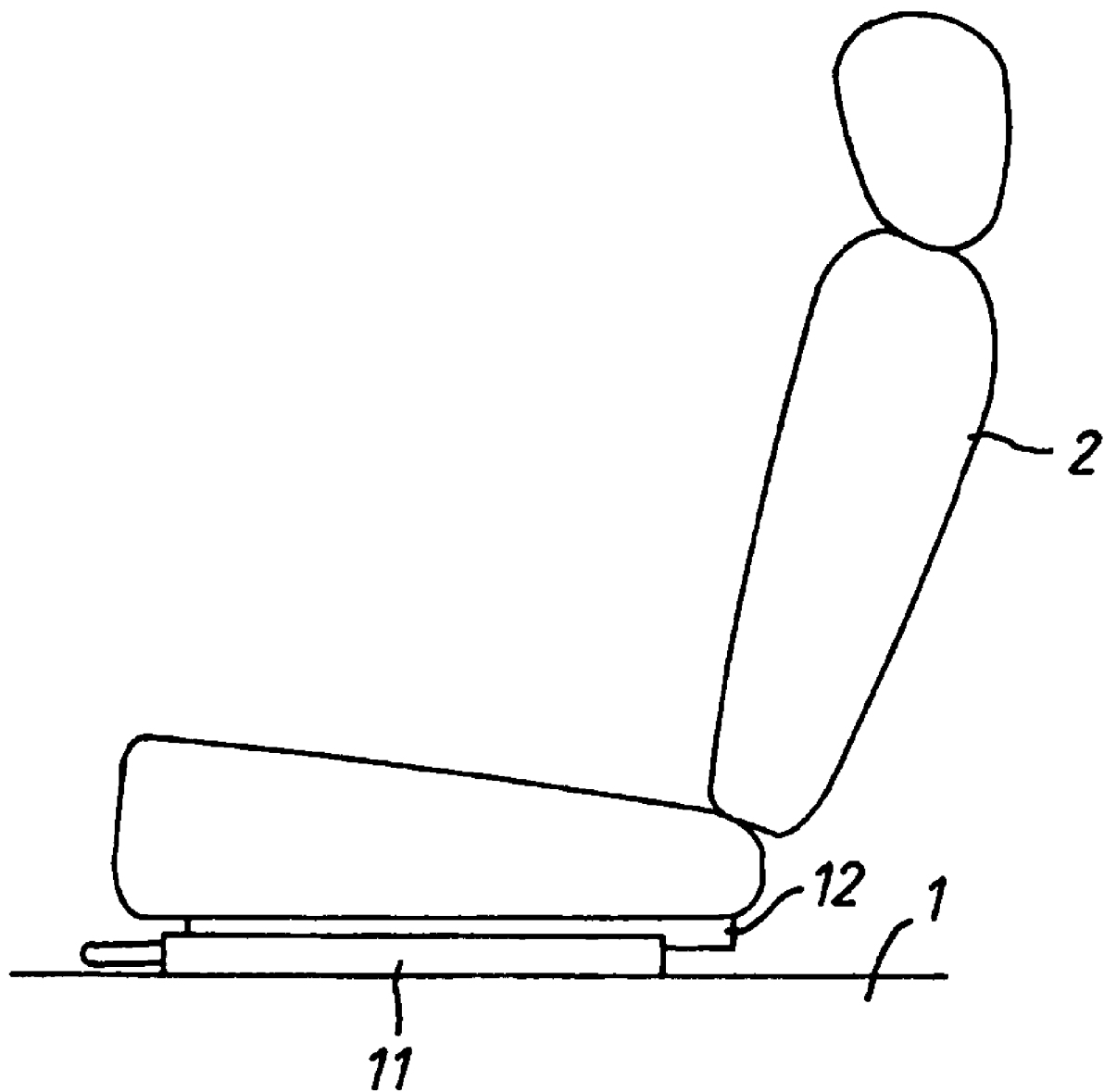
FIG. 1 is a slide view of a vehicle seat sliding apparatus according to a first embodiment of the present invention.
Figure 2:
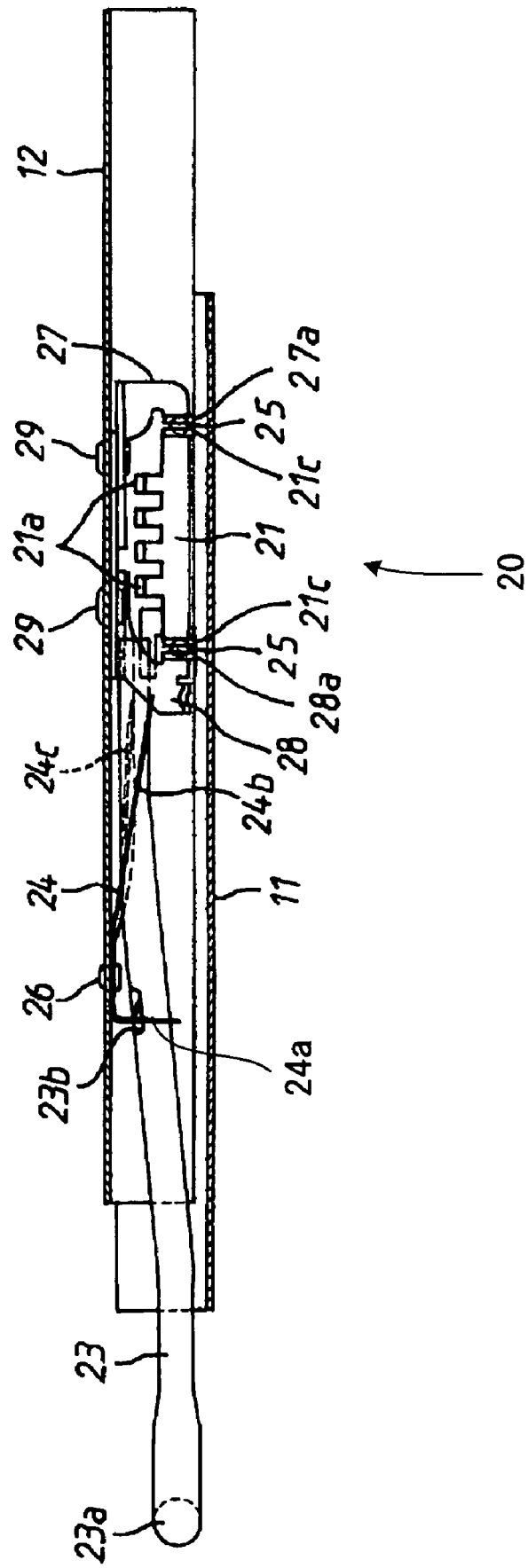
FIG. 2 is a slide view illustrating the inner structure of a vehicle seat sliding apparatus shown in FIG. 1.
Figure 3:
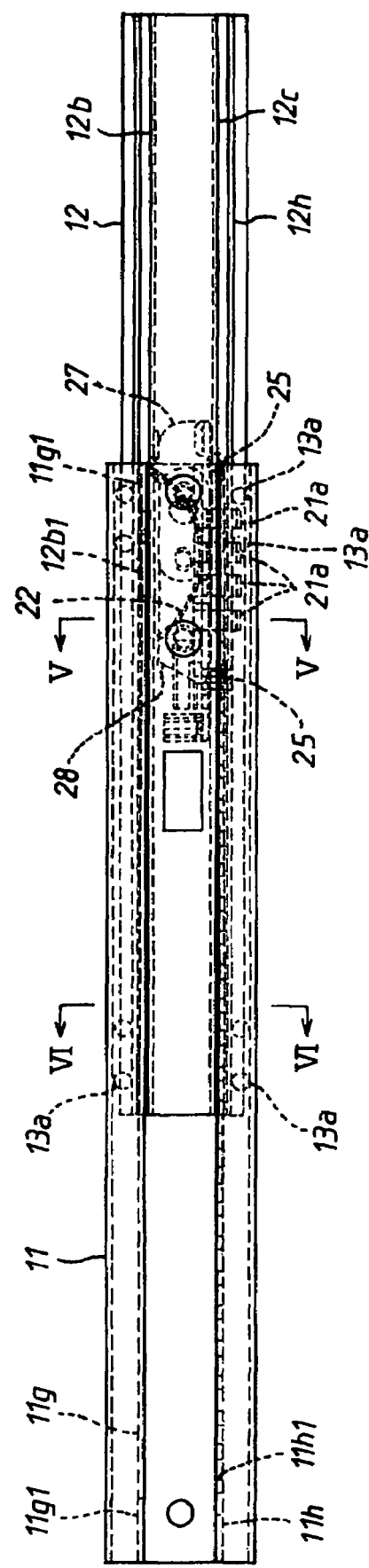
FIG. 3 is a plain view of the seat sliding apparatus shown in FIG. 1.
Figure 4:
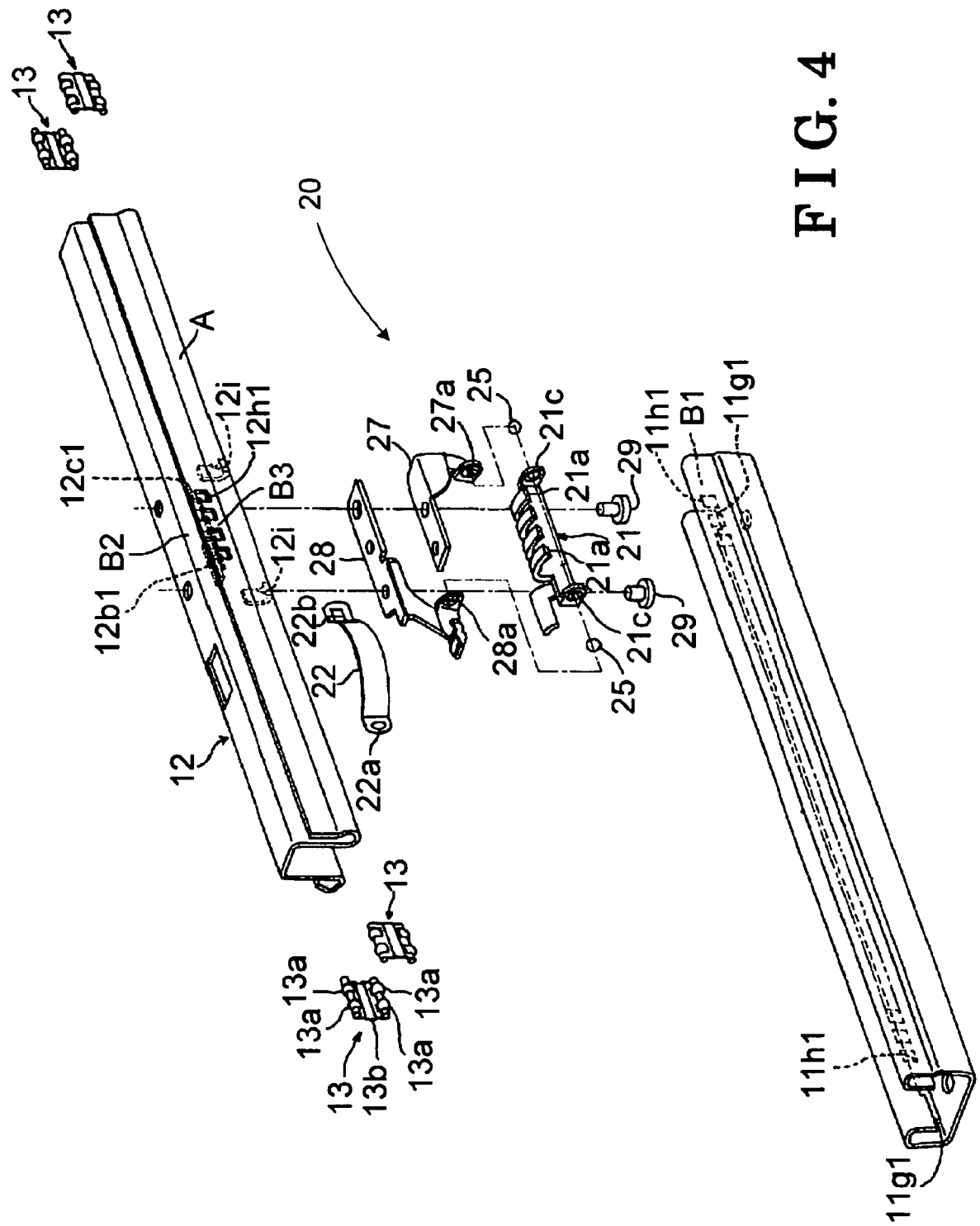
FIG. 4 is an exploded perspective view of the seat sliding apparatus shown in FIG. 1 to FIG. 3.
Figure 5:
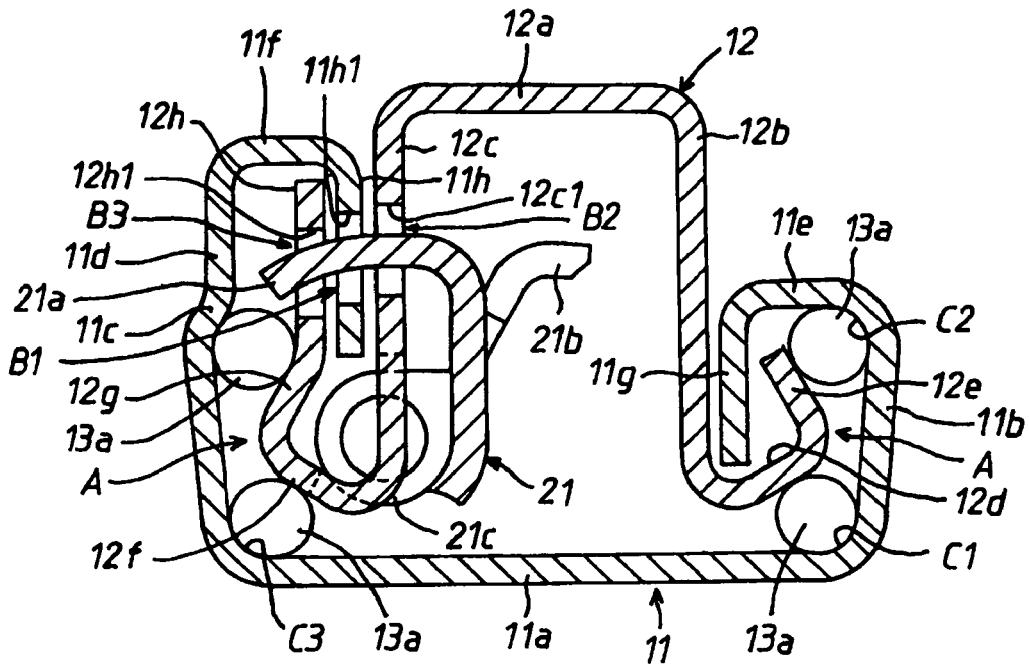
FIG. 5 is an enlarged sectional view, taken along a line V-V of FIG. 3, at which a sliding portion and a lock portion of the upper rail lie over.
Figure 6:
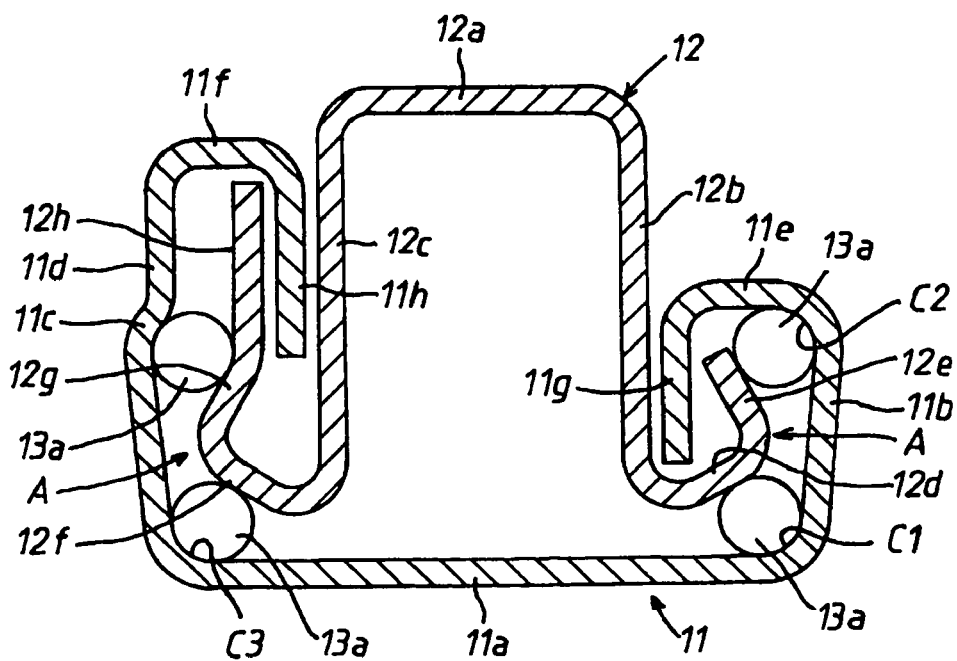
FIG. 6 is an enlarged sectional view of the vehicle seat sliding apparatus, taken along a line VI-VI of FIG. 3, illustrating only the sliding portion of the upper rail.

[First Embodiment] Embodiments of the present invention will be described below with reference to the attached drawings. FIGS. 1 and 3 are respectively a side view, and a plan view illustrating a seat sliding apparatus for a vehicle. FIG. 2 is a side view illustrating an internal structure of the seat sliding apparatus for the vehicle. FIG. 4 is a perspective view illustrating the seat sliding apparatus. FIG. 5 is a sectional view illustrating a portion of the seat sliding apparatus, at which a sliding portion and a lock portion of the upper rail lie over. FIG. 6 is a cross sectional view of the seat sliding apparatus illustrating only the sliding portion of the upper rail.

A seat sliding apparatus for a vehicle according to a first embodiment of the present invention includes: a pair of lower rails 11, which is fixedly provided at an upper surface of a floor 1 (stationary portion) of the vehicle and are arranged at the left and right portions of a seat 2; a pair of upper rails 12, which is fixedly provided at a lower surface of the seat 2 and are mounted to the lower rails 11; and a lock mechanism 20 arranged between each lower rail 11 and the corresponding upper rail 12. Each upper rail 12 is mounted onto the lower rail 11 via four ball units 13, each of which serves as a slide supporting member in a manner that each upper rail 12 is slidably movable at a predetermined moving amount in a front-rear direction of the lower rail 11 or in a traveling direction of the vehicle.

As is illustrated in FIGS. 5 and 6, each lower rail 11 includes: a bottom portion 11a; a first sidewall 11b; a bent portion 11c; a second sidewall 11d; a first upper wall 11e; a second upper wall 11f; a first vertical portion 11g; and a second vertical portion 11h, and they are integrally formed to establish the lower rail 11. The lower rail 11 exhibits an approximately identical cross section over an entire length along the front-rear or longitudinal direction thereof. FIGS. 5 and 6 illustrate therein only the lower rail 11, the upper rail 12, a lock lever 21, and balls 13a.

The bottom portion 11a exhibits an approximately rectangular shape and is arranged in parallel with the floor 1. The bottom portion 11a is fixedly mounted on the floor 1 (stationary portion). The first sidewall 11b is integrally formed at a side edge of the bottom portion 11a and stands upright in an upper direction. The second sidewall 11d is integrally formed at the other side edge of the bottom portion 11a and stands upright in the upper direction. The second sidewall 11d is higher than the first sidewall 11b. The bent portion 11c is formed partway or halfway on the second sidewall 11d. The first upper wall 11e is connected, at its one edge, to an upper edge of the first sidewall 11b and extends towards the second sidewall 11d in parallel with the bottom portion 11a. The second upper wall 11f is connected, at its one edge, to an upper edge of the second sidewall 11d and extends towards the first sidewall 11b in parallel with the bottom portion 11a. The first vertical portion 11g extends downwardly towards the bottom portion 11a from the other end of the first upper wall 11e. Second projections 11g1 and 11g1 are formed at both longitudinal ends of the first vertical portion 11g of the lower rail 11. The second projections 11g1 and 11g1 are arranged so as to impact with a first projection 12b1 formed at the upper rail 12 such that a longitudinal movement of the upper rail 12 to the lower rail 11 is restrained by the impact or contact between each second projections 11g1 and the first projection 12b1. The second vertical portion 11h extends downwardly towards the bottom portion 11a from the other edge of the second upper wall 11f. A plurality of holes 11h1 are formed over an entire length of second vertical portion 11h and are arranged at a predetermined interval against each adjacent hole 11h1 among from the holes 11h1. The holes 11h1 are fitted or engaged with nails 21a of the lock lever 21. An area or portion of the second vertical portion 11h, at which the holes 11h1 are provided, is referred to as a lock portion B1 (third lock portion of the lower rail 11).

As is illustrated in FIGS. 5 and 6, each upper rail 12 includes: an upper portion 12a; a third vertical portion 12b; a fourth vertical portion 12c; a first inclined portion 12d; a second inclined portion 12e; a third inclined portion 12f; a fourth inclined portion 12g; and an uprising portion 12h, and they are integrally formed to establish the upper rail 12. The upper rail 12 exhibits an approximately identical cross section over an entire length along the front-rear direction thereof.

The upper portion 12a is arranged in parallel with the bottom portion 11a of the lower rail 11 and is fixedly attached to the seat 2. The third vertical portion 12b extends downwardly from one edge of the upper portion 12a and is arranged between the first vertical portion 11g and the second vertical portion 11h. The third vertical portion 12b is mounted in the vicinity of the first vertical portion 11g and faces thereto in a parallel manner. The first projection 12b1 is provided at a longitudinally intermediate area of the third vertical portion 12b and projects towards the first vertical portion 11g. The first projection 12b1 makes a contact with each second projection 11g1 and restrains a forward/backward movement of the upper rail 12 relative to the lower rail 11. The fourth vertical portion 12c extends downward from the other edge of the upper portion 12a and is located between the first vertical portion 11g and the second vertical portion 11h. The fourth vertical portion 12c is designed to be approximately the same height as the third vertical portion 12b. The fourth vertical portion 12c is mounted in the vicinity of the second vertical portion 11h and faces thereto in a parallel manner. A plurality of holes 12c1 is formed at an approximately longitudinally intermediate area of the fourth vertical portion 12c. The holes 12c1 are provided at the same quantity as the nails 21a and are arranged at the predetermined interval against each adjacent hole 12c1 in a way that the holes 12c1 are fitted or engaged with the nails 21a of the lock lever 21. An area or portion of the fourth vertical portion 12c, in which the holes 12c1 are provided, is referred to a lock portion B2 (first lock portion of the upper rail 12).

The first inclined portion 12d is connected, at its one edge, to a lower edge of the third vertical portion 12b and extends in an angled upward direction towards the first sidewall 11b. More specifically, the first inclined portion 12d is arranged so as to face a corner C1, which is defined by the bottom portion 11a and the first sidewall 11b, with a space. The second inclined portion 12e is connected to the other edge of the first inclined portion 12d and extends in an angled upward direction towards the first vertical portion 11g. More specifically, the second inclined portion 12e is arranged so as to face a corner C2, which is defined by the first sidewall 11b and the first upper wall 11e, with a space. The third inclined portion 12f is connected, at its one edge, to the lower edge of the fourth vertical portion 12c and extends in an angled upward direction towards the second sidewall 11d. More specifically, the third inclined portion 12f is arranged so as to face a corner C3, which is defined by the bottom portion 11a and the second sidewall 11d, with a space. The fourth inclined portion 12g is connected, at its one edge, to the other edge of the third inclined portion 12f and extends in an angled upward direction towards the second vertical portion 11h. More specifically, the fourth inclined portion 12g is arranged so as to face the bent portion 11c with a space. The uprising portion 12h is connected to the other edge of the fourth inclined portion 12g in a standing position and is arranged in the vicinity of the second vertical portion 11h in parallel thereto. A plurality of holes 12h1 is formed at an approximately longitudinally intermediate area of the uprising portion 12h. The holes 12h1 are fitted or engaged with the nails 21a of the lock lever 21 because the holes 12h1 are provided at the same quantity as the nails 21a and are arranged at the predetermined interval against each adjacent hole 12h1. An area or portion of the uprising portion 12h, in which the holes 12h1 are provided, is referred to a lock portion B3 (second lock portion of the upper rail 12).

Each ball unit 13 (slide supporting member) is set between each upper rail 12 and the corresponding lower rail 11 and supports both rails 11 and 12 in a way that the upper rail 12 is slidably movable relative to the lower rail 11. Further, the ball unit 13 positions the upper rail 12, which has been already assembled to the lower rail 11, at the finally assembled position illustrated in FIGS. 5 and 6. Going back to FIG. 4, each ball unit 13 includes four balls (rolling elements) 13a and a holder 13b supporting the balls 13a so that the balls 13a roll. Referring again to FIGS. 5 and 6, the first ball 13a from among the ball 13a is positioned to roll within a space defined between the corner C1 and the first inclined portion 12d facing the corner C1. Likewise, the second ball 13a from among the balls 13a is positioned to roll within a space defined between the corner C2 and the second inclined portion 12e, and the third ball 13a from among the balls 13a is positioned to roll within a space between the corner C3 and the third inclined portion 12f. The fourth ball 13a from among the ball 13a is positioned to roll within a space between the bent portion 11c and the fourth inclined portion 12g facing the bent portion 11c. Accordingly, slide portions A of the upper rails are established with the first inclined portion 12d, the second inclined portion 12e, the third inclined portion 12f and the fourth inclined portion 12g.

The forth corners are defined by the corner C1, C2, C3 and the bent portion 11c as described above. Moreover, the first inclined portion 12d, the second inclined portion 12e, the third inclined portion 12f and the forth inclined portion 12g have surfaces facing each corner.

The lock mechanism 20 acts to releasably lock the upper rail 12 and the lower rail 11, i.e., acts to prohibit the upper rail 12 from moving relative to the lower rail 11 in the longitudinal direction. The lock mechanism 20 includes: the lock lever 21; a spring member 22; an operating lever 23; a plate-shaped elastic body 24; a pair of balls 25; a pin 26; first and second brackets 27 and 28; and two pins 29. In FIGS. 3 and 4, the operating lever 23, the elastic body 24 and the pin 26 are not illustrated to simplify the illustrations.

As is apparent from FIGS. 2 and 3, the lock lever 21 is attached within a cross section of the upper rail 12 and the lower rail 11 and extends in the front-rear direction. The lock lever 21 is pivotably equipped to the upper rail 12. The lock lever 21 is provided with the nails 21a, which are fitted into or engageable with the holes 12c1 of the fourth vertical portion 12c and the holes 12h1 of the uprising portion 12h. The nails 21a are further fitted into or engageable with the holes 11h1 of the second vertical portion 11h. These engagements between the holes and the nails 21a are each implemented from the inside of the rails 11 and 12 towards the outside thereof. The fourth vertical portion 12c and the uprising portion 12h are a pair of wall portions which are provided at the upper rail 12 and face each other. The second vertical portion 11h of the lower rail 11 is a wall portion disposed between the pair of the wall portions of the upper rail 12. That is, the lock lever 21 is engageably and disengageably fitted into the lock portions B2 and B3, which both are formed at the upper rail 12 and face each other, and the lock portion B1 of the lower rail 11 positioned between the lock portions B2 and B3. Alternatively, a pair of wall portions facing each other may be provided at the lower rail 11 so that a pair of lock portions is formed at both the wall portions respectively, and a wall portion may be provided at the upper rail 12 and positioned between the wall portions of the lower rail 11. The wall portion of the upper rail 12 is formed with a lock portion. The lock lever 21 is provided with an arm 21b pushed by the operating lever 23 in response to operation of the operating lever 23.

The lock lever 21 is further formed with a pair of bearings 21c, both of which are formed at its longitudinal ends and extend in a right-and-left (lateral) direction. The bearings 21c each exhibit an approximately concave shape. The first and second brackets 27 and 28 include bearings 27a and 28a, respectively. The lock lever 21 is pivotably supported by the first and second brackets 27 and 28 via the balls 25 that come in contact with the bearings 21c from the frontward and the rearward and come in contact with the bearings 27a and 28a.

As is illustrated in FIGS. 3 and 4, the spring member 22 is provided between the lock lever 21 and the upper rail 12 inside of the cross section of the rails 11 and 12. The spring member 22 includes a mounting hole 22a at its front end and a long hole 22b at its rear end. The spring member 22 is integrally fixed to the upper rail 12 via the mounting hole 22a and is mounted to the upper rail 12 via the long hole 22b in a way that the spring member 22 is movable in the longitudinal direction. The spring member 22 further includes an arc portion at its longitudinally intermediate area, an arc portion which makes a contact with the lock lever 21 and biases the lock lever 21 in a locking direction, i.e., in a direction in which the nails 21a are fitted into at least one of the lock portions B1, B2 and B3.

The operating lever 23 acts to tilt the lock lever 21 and includes an operating portion 23a extending from the front end of the upper rail 12 towards a front. The operating lever 23 is mounted to the upper rail 12 to be tilted via the plate-shaped elastic body 24 inside the upper rail 12. The operating lever 23 functions to pivotally actuate the lock levers 21, which are supplied at the right and left seat portions, at the same time. Therefore, the left-side upper rail 12 is operatively connected to the right-side upper rail 12 by means of the operating portion 23a of the operating lever 23. This sort of lever is generally referred to as a loop handle.

The plate-shaped elastic body 24 is integrally equipped to the upper rail 12 by means of the pin 26, i.e., is fixed to the upper rail 12 by riveting or caulking an upper end of the pin 26. The elastic body 24 includes a support arm 24a, which is engageable with an engaging hole 23b of the operating lever 23 to support the operating lever 23 to be tilted. The elastic body 24 further includes a U-shaped supporting portion 24b, which elastically supports a U-shaped cross sectional rear end portion 23c of the operating lever 23, and an I-shaped supporting portion 24c. A rear end of the supporting portion 24b is engaged with a lower surface of the rear end portion 23c of the operating lever 23. A rear end of the supporting portion 24c is engaged with an upper surface of the rear end portion 23c of the operating lever 23, i.e., a bottom surface of the U-shaped cross section.

The first bracket 27 is integrally attached to the upper rail 12 by means of a pin 29. More specifically, the first bracket 27 is secured to the upper rail 12 by riveting or caulking an upper portion of the pin 29. The first bracket 27 is provided with a bearing 27a, which extends in the lateral direction and is formed in an approximately concave shape. The bearing 27a comes in contact with one of the balls 25 rotatably supported by the bearing 21c. The bearings 27a and 21c are inserted into a bearing bore 12i while interposing the ball 25 therebetween.

The second bracket 28 is integrally attached to the upper rail 12 by means of two pins 29. More specifically, the second bracket 28 is secured to the upper rail 12 by riveting or caulking an upper portion of the pins 29. The second bracket 28 is provided with a bearing 28a, which extends in the lateral direction and is formed in an approximately concave shape. The bearing 28a comes in contact with the other one of the balls 25 rotatably supported by the bearing 21c. The bearings 28a and 21c are inserted into the other bearing bore 12i while interposing the ball 25 therebetween.

In the seat sliding apparatus for a vehicle with the above-described structure according to the first embodiment of the present invention, as illustrated in FIG. 5, when the operating lever 23 is not operated, the lock lever 21 is biased by the spring member 22 so as to be maintained at a lock position, and the nails 21a are fitted into or engaged with the holes 12c1, 11h1 and 12h1 from the inside of the rails 11 and 12 to the outside thereof. In such circumstances, the upper rail 12 is hence locked with the lower rail 11, i.e., the upper rail 12 is prohibited from slidably moving relative to the lower rail 11.

Meanwhile, once the operating portion 23a of the operating lever 23 is lifted up and operated, the lock lever 21 is tilted against the biasing force of the spring member 22. The nails 21a are then disengaged from the holes 12c1 and 12h1 of the upper rail 12 and the holes 11h1 of the lower rail 11. In such circumstances, the lock mechanism 20 functions so as to release the locked state, and the upper rail 12 is allowed to slidably move relative to the lower rail 11.

As apparent from the above explanation, in the first embodiment, the sliding portions A are formed along the longitudinal direction over the entire length of the upper rail 12, i.e., are continuously formed along a sliding direction of the upper rail, and the lock portions of the upper rail B2, B3 are formed on the upper portion (or the lower portion) of the sliding portions A of the upper rail 12, i.e., are formed at one of the upper rail side and the lower rail side relative to the sliding portion. Therefore, the lock portions B2 and B3 can be formed in parallel, not in series, with the sliding portions A of the upper rail 12. Thus, the entire length of the lock portions B2 and B3 can be shortened by the lengths of the lock portions B2 and B3 than a conventional one. In addition, the cross section of the upper rail 12 is continuous along the longitudinal direction because the sliding portions A of the upper rail 12 are formed longitudinally over the entire upper rail 12. Therefore, the upper rail 12 is easily manufactured and achieves high mechanical strength.

Also, as described above, in the seat sliding apparatus which has the lock portions at one side of the upper rail 12 and the lower rail 11, the sliding portions A of the upper rail 12 are easily formed along the longitudinal direction over the entire length of the upper rail 12, and the lock portions B2, B3 are easily formed on the upper portion of the sliding portions A of the upper rail 12.

Further, in the first embodiment, the lock portions B2, B3 of the upper rail 12 are formed on the upper portion of the sliding portions A of the upper rail 12. The lock portions B2 and B3 may be formed on the lower portion of the sliding portions A of the upper rail 12.

Additionally, in the first embodiment described above, the lock mechanism 20 is structured in a way that the nails 21a, which extend in a predetermined direction, engage from the inside of both rails 11 and 12 toward the outside of both rails 11 and 12. Alternatively, the lock mechanism 20 may be structured in a way that the nails 21a engage from the outside of both rails 11 and 12 toward the inside of both rails 11 and 12.

Moreover, in the first embodiment described above, the sliding supporting member 13 has the balls 13a which contact the upper rail 12 and the lower rail 11 to roll. The lower rail 11 has the four corners including the three corners C1, C2, C3 and the bent portion 11C. The balls 13a are disposed in the four corners of the lower rail 11 within a range positioned vertically lower than the lock portions B1, B2, B3 in a space surrounded by the upper rail 12 and the lower rail 11. Therefore, the lock portions B1, B2 and B3 and the sliding portions A are arranged in parallel in a vertical direction not in series along the longitudinal direction. Also, in the first embodiment described above, the inclined portions (the first inclined portion 12d, the second inclined portion 12e, the third inclined portion 12f and the forth inclined portion 12g) are formed at the upper rail 12 and each inclined portion has a surface facing each corner. Therefore, the upper rail 12 is slidably supported by the lower rail 11 with a simple structure.

In addition, in the first embodiment described above, the lock lever 21 includes the nails 21a extending in the predetermined direction. The nails 21a of the lock lever 21 are fitted into the lock portions B2 and B3, which are formed on wall portions (the forth vertical portion 12c and the uprising portion 12h respectively) facing each other on the upper rail 12, and the lock portion B1. The lock portion B1 is formed on a wall portion (the second vertical portion 11h) which is formed on the lower rail 11 and disposed between the wall portions of the upper rail 12 (the forth vertical portion 12c and the uprising portion 12h). Alternatively, the nails 21 are fitted into lock portions formed on wall portions which are formed on the lower rail 11 facing each and a lock portion of the upper rail 12. The lock portion of the upper rail is formed on a wall portion which is formed on the upper rail 12 and disposed between the wall portions of the lower rail 11. That is, when a force is applied in the forward and backward direction, the nails 21a of the lock lever 21, which engage with the lock portions of one rail at its both sides, engage with the lock portion of the other rail at the position located between positions where the nails 21a engage with the lock portions. Therefore, the seat sliding apparatus achieves high strength against a force in the forward and backward direction with a simple construction.

Figure 7:
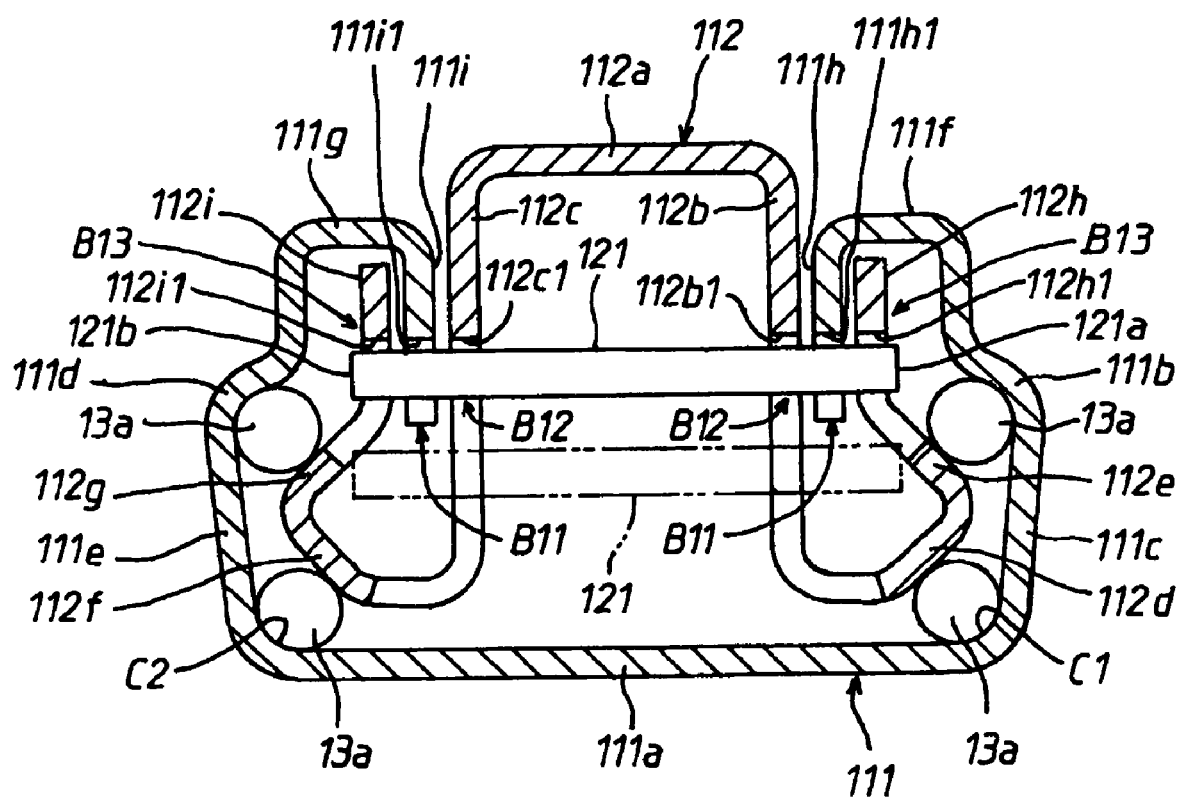
FIG. 7 is an enlarged sectional view of the seat sliding apparatus according to the second embodiment.

A second embodiment of the present invention will be explained with reference to illustrations of drawing figures as follows. FIG. 7 is a cross sectional view of a seat sliding apparatus, illustrating a portion at which a sliding portion and a lock portion of the upper rail lie over. In the first embodiment described above, the lock lever 21 has the nails 21a extending in the predetermined direction and the lock portions are formed on one side of the lower rail 11 and the upper rail 12. In the second embodiment, a lock lever 121 has nails 121a and 121b which extend on both sides of the lock lever 121 and extend towards the outer side. Also, the lock portions are formed on one side of both an upper rail 112 and a lower rail 111. The second embodiment is different from the first embodiment in the upper rail 112, the lower rail 111, and the lock lever 121 and other components are nearly identical with the first embodiment.

As illustrated in FIG. 7, each lower rail 111 includes: a bottom portion 111a; a first bent portion 111b; a first sidewall 111c; a second bent portion 111d; a second sidewall 111e; a first upper wall 111f; a second upper wall 111g; a first vertical portion 111h; and a second vertical portion 111i, and they are integrally formed to establish the lower rail 111. The lower rail 111 exhibits an approximately identical cross section over an entire length along the front-rear or longitudinal direction thereof.

The bottom portion 111a exhibits an approximately rectangular shape and is arranged in parallel with the floor 1. The bottom portion 111a is fixedly mounted on the floor 1 (stationary portion). The first sidewall 111c is integrally formed at a side edge of the bottom portion 111a and stands upright in an upper direction. The first bent portion 111b is formed partway or halfway on the first sidewall 111c. The second sidewall 111e is integrally formed at the other side edge of the bottom portion 111a and stands upright in the upper direction. The second bent portion 111d is formed partway or halfway on the second sidewall 111e and designed to be approximately the same height as the first bent portion 111b. The first upper wall 111f is connected, at its one edge, to an upper edge of the first sidewall 111c and extends towards the second sidewall 111e in parallel with the bottom portion 111a. The second upper wall 111g is connected, at its one edge, to an upper edge of the second sidewall 111e and extends towards the first sidewall 111c in parallel with the bottom portion 111a. The first vertical portion 111h extends downwardly towards the bottom portion 111a from the other end of the first upper wall 111f. The second vertical portion 111i extends downwardly towards the bottom portion 111a from the other edge of the second upper wall 111g.

A plurality of notches 111h1 are formed over an entire length of the first vertical portion 111h and are arranged at a predetermined interval against each adjacent notch 111h1 among from the notches 111h1. The notches 111h1 are fitted or engaged with nails 121a which are formed on one side of the lock lever 121. An area or portion of the first vertical portion 111h, at which the notches 111h1 are provided, is referred to as a lock portion B11 (the third lock portion of the lower rail 111). A plurality of notches 111i1 are formed over an entire length of the second vertical portion 111i and are arranged at a predetermined interval against each adjacent notch 111i1 among from the notches 111i1. The notches 111i1 are fitted or engaged with nails 121b which are formed on the other side of the lock lever 121. An area or portion of the first vertical portion 111i, at which the notches 111i1 are provided, is referred to as a lock portion B11 (the third lock portion of the lower rail 111).

As is illustrated in FIGS. 7, each upper rail 112 includes: an upper portion 112a; a third vertical portion 112b; a fourth vertical portion 112c; a first inclined portion 112d; a second inclined portion 112e; a third inclined portion 112f, a fourth inclined portion 112g; and an first uprising portion 112h, and a second uprising portion 112i, and they are integrally formed to establish the upper rail 112. The upper rail 112 exhibits an approximately identical cross section over an entire length along the front-rear direction thereof.

The upper portion 112a is arranged in parallel with the bottom portion 111a of the lower rail 111 and is fixedly attached to the seat 2. The third vertical portion 112b extends downwardly from one edge of the upper portion 112a and is arranged between the first vertical portion 111h and the second vertical portion 111i. The third vertical portion 112b is mounted in the vicinity of the first vertical portion 111h and faces thereto in a parallel manner. A plurality of holes 112b1 is formed at an approximately longitudinally intermediate area of the third vertical portion 112b. The holes 112b1 are provided at the same quantity as the nails 121a and are arranged at a predetermined interval against each adjacent hole 112b1 in a way that the holes 112b1 are fitted or engaged with the nails 121a of the lock lever 121. An area or portion of the third vertical portion 112b, in which the holes 112b1 are provided, is referred to a lock portion B12 (the first lock portion of the upper rail 112).

The fourth vertical portion 112c extends downward from the other edge of the upper portion 112a and is located between the first vertical portion 111h and the second vertical portion 111i. The fourth vertical portion 112c is designed to be approximately the same height as the third vertical portion 112b. The fourth vertical portion 112c is mounted in the vicinity of the second vertical portion 111i and faces thereto in a parallel manner. A plurality of holes 112c1 is formed at an approximately longitudinally intermediate area of the fourth vertical portion 112c. The holes 112c1 are fitted or engaged with the nails 121b of the lock lever 121 because the holes 112c1 are provided at the same quantity as the nails 121b and are arranged at a predetermined interval against each adjacent hole 112c1. An area or portion of the fourth vertical portion 112c, in which the holes 112c1 are provided, is referred to a lock portion B12 (the first lock portion of the upper rail 112).

The first inclined portion 112d is connected, at its one edge, to a lower edge of the third vertical portion 112b and extends in an angled upward direction towards the first sidewall 111c. More specifically, the first inclined portion 112d is arranged so as to face a corner C1, which is defined by the bottom portion 111a and the first sidewall 111c, with a space. The second inclined portion 112e is connected to the other edge of the first inclined portion 112d and extends in an angled upward direction towards the first vertical portion 111h. More specifically, the second inclined portion 112e is arranged so as to face the first bent portion 111b with a space. The third inclined portion 112f is connected, at its one edge, to the lower edge of the fourth vertical portion 112c and extends in an angled upward direction towards the second sidewall 111e. More specifically, the third inclined portion 112f is arranged so as to face a corner C2, which is defined by the bottom portion 111a and the second sidewall 111e, with a space. The fourth inclined portion 112g is connected, at its one edge, to the other edge of the third inclined portion 112f and extends in an angled upward direction towards the second vertical portion 111i. More specifically, the fourth inclined portion 112g is arranged so as to face the second bent portion 111d with a space.

The first uprising portion 112h is connected to the other edge of the second inclined portion 112e and is arranged in the vicinity of the first vertical portion 111h in parallel thereto. A plurality of holes 112h1 is formed at an approximately longitudinally intermediate area of the first uprising portion 112h. The holes 112h1 are fitted or engaged with the nails 121a of the lock lever 121 because the holes 112h1 are provided at the same quantity as the nails 121a and are arranged at a predetermined interval against each adjacent hole 112h1. An area or portion of the first uprising portion 112h, in which the holes 112h1 are provided, is referred to a lock portion B13 (the second lock portion of the upper rail 112). The second uprising portion 112i is connected to the other edge of the fourth inclined portion 112g and is arranged in the vicinity of the second vertical portion 111i in parallel thereto. A plurality of holes 112i1 is formed at an approximately longitudinally intermediate area of the second uprising portion 112i. The holes 112i1 are fitted or engaged with the nails 121b of the lock lever 121 because the holes 112i1 are provided at the same quantity as the nails 121b and are arranged at a predetermined interval against each adjacent hole 112i1. An area or portion of the second uprising portion 112i, in which the holes 112i1 are provided, is referred to a lock portion B13 (the second lock portion of the upper rail 112).

The sliding portions A of the upper rail 112 are constituted by the first inclined portion 112d, the second inclined portion 112e, the third inclined portion 112f and the forth inclined portion 112g.

The nails 121a and 121b are formed on both sides of the lock lever 121. The nails 121a are formed on one side portion of the lock lever 121 and fit into the lock portions B12, B13, which formed on the third vertical portion 112b and the first uprising portion 112h of the upper rail 112 respectively, and the lock portion B11. The lock portion B11 is formed on the first vertical portions of the lower rail 11. Also, the nails 121b are formed on the other side portion of the lock lever 121 and fit into the lock portions B12, B13, which are formed on the forth vertical portion 112C and the second uprising portion 112i of the upper rail 112 respectively, and the rock portion B11. The lock portion B11 is formed on the second vertical portion 111i.

In the seat sliding apparatus for a vehicle with the above-described structure according to the second embodiment of the present invention, as illustrated in FIG. 7, when the operating lever 23 is not operated, the lock lever 121 is biased by the spring member 22 so as to be maintained at a lock position, and the nails 121a and 121b are fitted into or engaged with the holes 112b1, 112c1, 112h1 and 112i1 and the notches 111h1 and 111i1 from the lower portion of the rails 11 and 12 to the upper portion thereof. In such circumstances, the upper rail 112 is hence locked with the lower rail 111, i.e., the upper rail 112 is prohibited from slidably moving relative to the lower rail 111.

Meanwhile, once the operating portion 23a of the operating lever 23 is lifted up and operated, the lock lever 121 is tilted against the biasing force of the spring member 22. The nails 121a and 121b are then disengaged from the holes 112b1, 112c1 112h1, and 112i1 of the upper rail 12 and the notches 111h1 and 111i1 of the lower rail 111 to come down to the position indicated by a double dash line. In such circumstances, the lock mechanism 20 functions so as to release the locked state, and the upper rail 112 is allowed to slidably move relative to the lower rail 111.

According to the second embodiment, in the seat sliding apparatus which has the lock portions on both sides of the upper rail 112 and the lower rail 111, the sliding portions A of the upper rail 112 is easily formed along the longitudinal direction over the entire length of the upper rail 112, and the lock portions B12, B13 is easily formed on the upper portion of the sliding portions A of the upper rail 112.

Figure 8:
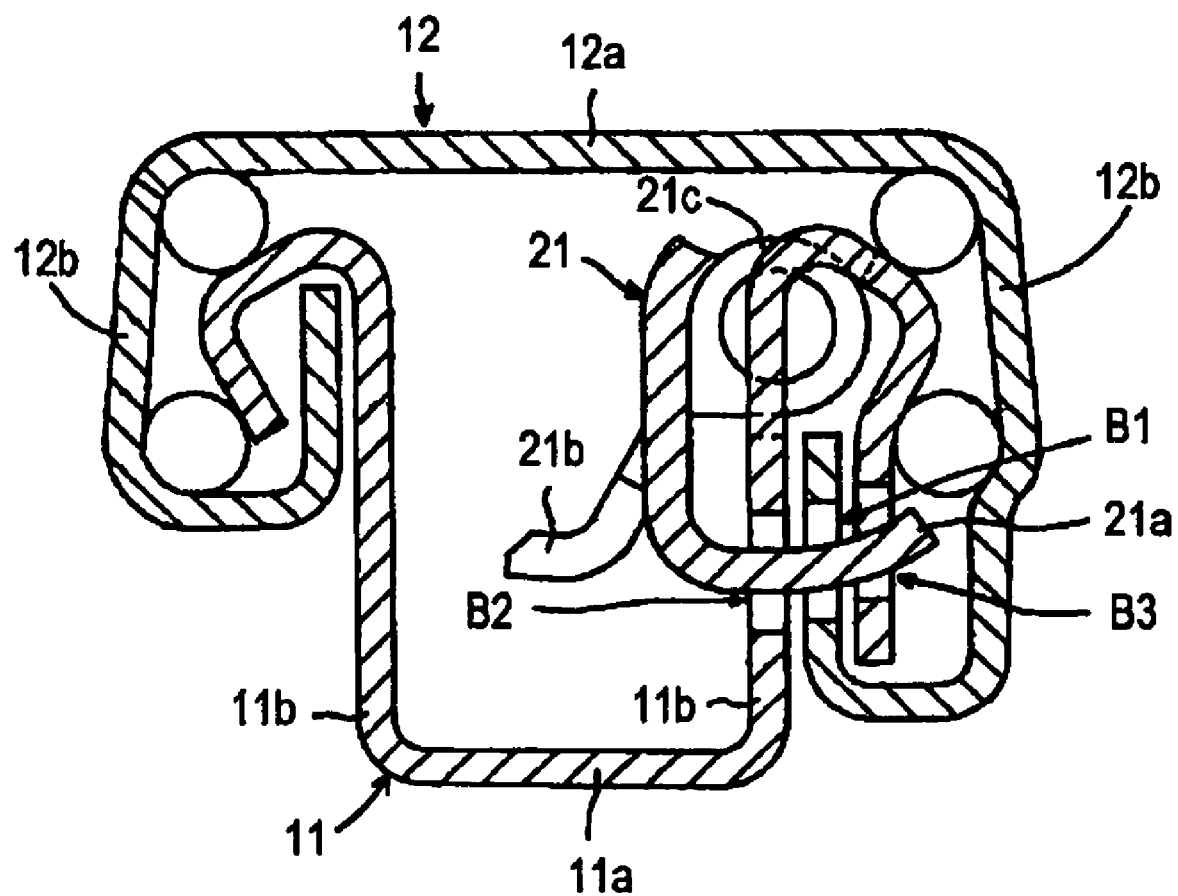
FIG. 8 is an enlarged sectional view of the seat sliding apparatus according to a variation of the present invention.
Figure 9:
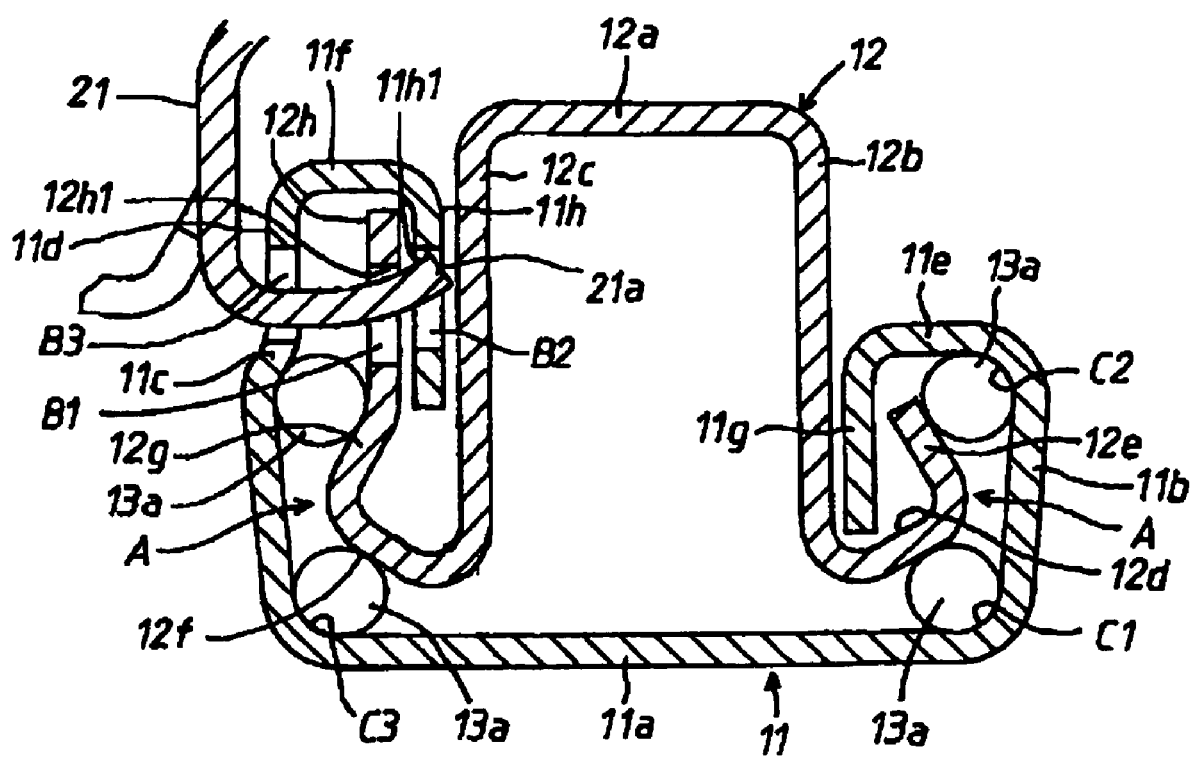
FIG. 9 is an enlarged sectional view of the seat sliding apparatus according to a variation of the present invention.

In FIGS. 8, the first lock portion B2 and the second lock portion B3 are provided at the lower rail 11, and the third lock portion B1 is provided at the upper rail 12. In FIG. 9, the first lock portion B2 and the second lock portion B3 are provided at the second vertical portion 11h and the second sidewall 11d of the lower rail 11 and the third lock portion B1 is provided at the uprising portion 12h of the upper rail 12. The nails 21a of the lock lever 21 are fitted into the lock portion B1 of the uprising portion 12h and the lock portions B2, B3 of the second vertical portion 11d and the second sidewall 11h.

In each embodiment described above, the ball units 13 are employed as slide supporting members. However, other materials, which are able to fit into the space between both the rails 11 and 12 and slidably support both the rails 11 and 12 providing excellent lubricity, may be used. For example, a member which is made of resinous materials or metal materials may be used by being formed to fit in the space between both the rails 11 and 12.

The principles, of the preferred embodiments and mode of operation of the present invention have been described in the foregoing specification. However, the invention, which is intended to be protected, is not to be construed as limited to the particular embodiment disclosed. Further, the embodiment described herein are to be regarded as illustrative rather than restrictive. Variations and changes may be made by others, and equivalents employed, without departing from the spirit of the present invention. Accordingly, it is expressly intended that all such variations, changes and equivalents that fall within the spirit and scope of the present invention as defined in the claims, be embraced thereby.

The invention claimed is:

1. A seat sliding apparatus for a vehicle, comprising:
   a lower rail provided at a stationary portion of a vehicle floor;
   an upper rail provided at a seat of the vehicle and mounted on the lower rail so as to move relative to the lower rail;
   a lock mechanism having a lock lever for releasably locking the upper rail with the lower rail;
   a slide supporting member disposed between the upper rail and the lower rail and slidably supporting the upper rail relative to the lower rail;
   a first sliding portion provided at the upper rail and with which the slide supporting member slidably comes in contact, and a second sliding portion provided at the lower rail and with which the slide supporting member slidably comes in contact;
   a first lock portion and a second lock portion provided at one of the upper rail and the lower rail, the first lock portion and the second lock portion facing each other;
   a third lock portion provided at the other one of the upper rail and the lower rail and located between the first lock portion and the second lock portion, the lock lever being engageably and disengageably fitted into at least one of the first, second and third lock portions;
   the first sliding portion of the upper rail being formed along a longitudinal direction over an entire length of the upper rail in the longitudinal direction; and
   the lock portion of the upper rail being arranged entirely at one of an upper side and a lower side of the first sliding portion of the upper rail.

2. A seat sliding apparatus for a vehicle according to claim 1, wherein
   the lower rail includes:
   a bottom portion arranged in parallel with the stationary portion of the vehicle;
   a first sidewall arranged vertically at a side edge of the bottom portion;
   a second sidewall arranged vertically at the other side edge of the bottom portion and being higher than the first sidewall, the second sidewall being provided with a bent portion;
   a first upper wall connected, at an edge thereof, to an upper edge of the first sidewall and extending towards the second sidewall;
   a second upper wall connected, at an edge thereof, to an upper edge of the second sidewall and extending towards the first sidewall;
   a first vertical portion extending downwardly from the other edge of the first upper wall towards the bottom portion;
   a second vertical portion extending downwardly from the other edge of the second upper wall towards the bottom portion;
   the upper rail includes:
   an upper portion arranged in parallel to the bottom portion of the lower rail;

a third vertical portion extending downwardly from an edge of the upper portion and disposed between the first vertical portion and the second vertical portion;
a fourth vertical portion extending downwardly from the other edge of the upper portion and disposed between the first vertical portion and the second vertical portion, the fourth vertical portion having a height identical to the third vertical portion;
a first inclined portion connected, at an edge thereof, to a lower edge of the third vertical portion and extending in an inclined upward direction towards the first side wall, the first inclined portion being arranged so as to face a corner with a space, the corner being defined by the bottom portion and the first sidewall;
a second inclined portion connected, at an edge thereof, to the other edge of the first inclined portion and extending in an inclined upward direction towards the first vertical portion, the second inclined portion being arranged so as to face a corner with a space, the corner being defined by the first sidewall and the first upper wall;
a third inclined portion connected, at an edge, to a lower edge of the fourth vertical portion and extending in an inclined upward direction towards the second sidewall, the third inclined portion being arranged so as to face a corner with a space, the corner being defined by the bottom portion and the second sidewall;
a fourth inclined portion connected, at an edge of thereof, to the other edge of the third inclined portion and extending in an inclined upward direction towards the second vertical portion, the forth inclined portion being arranged so as to face the bent portion with a space; and
an uprising portion connected to the other edge of the fourth inclined portion and facing the second vertical portion in a parallel manner,
wherein the slide supporting member includes a plurality of balls, each ball is rotatably arranged between one of the corresponding corner and the bent portion and each inclined portion, the sliding portion of the upper rail includes the first inclined portion, the second inclined portion, the third inclined portion and the fourth inclined portion, the first lock portion and the second lock portion are provided at the fourth vertical portion and the uprising portion of the upper rail and the third lock portion is provided at the second vertical portion of the lower rail or the first lock portion and the second lock portion are provided at the second vertical portion and the second sidewall of the lower rail and the third lock portion is provided at the uprising portion of the upper rail, the lock lever includes nails extending in a predetermined direction, the nails of the lock lever are fitted into the first and second lock portions of the fourth vertical portion and the uprising portion and the third lock portion of the second vertical portion or are fitted into the lock portion of the uprising portion and the lock portions of the second vertical portion and the second sidewall.

3. A seat sliding apparatus for a vehicle according to claim 1, wherein
the lower rail includes:
a bottom portion arranged in parallel with the stationary portion of the vehicle;
a first sidewall arranged vertically at a side edge of the bottom portion, the first sidewall being provided with a first bent portion;
a second sidewall arranged vertically at the other side edge of the bottom portion, the second sidewall being provided with a second bent portion at the same height as the first bent portion;
a first upper wall connected, at an edge thereof, to an upper edge of the first sidewall and extending towards the second sidewall;
a second upper wall connected, at an edge thereof, to an upper edge of the second sidewall and extending towards the first sidewall;
a first vertical portion extending downwardly from the other edge of the first upper wall towards the bottom portion;
a second vertical portion extending downwardly from the other edge of the second upper wall towards the bottom portion;
the upper rail includes:
an upper portion arranged in parallel to the bottom portion of the lower rail;
a third vertical portion extending downwardly from an edge of the upper portion and arranged between the first vertical portion and the second vertical portion;
a fourth vertical portion extending downwardly from the other edge of the upper portion and arranged between the first vertical portion and the second vertical portion, the fourth vertical portion having a height identical to the third vertical portion;
a first inclined portion connected, at an edge thereof, to a lower edge of the third vertical portion and extending in an inclined upward direction towards the first sidewall, the first inclined portion being arranged so as to face a corner with a space, the corner being defined by the bottom portion and the first sidewall;
a second inclined portion connected, at an edge thereof, to the other edge of the first inclined portion and extending in an inclined upward direction towards the first vertical portion, the second inclined portion being arranged so as to face the first bent portion with a space;
a third inclined portion connected, at an edge thereof, to a lower edge of the fourth vertical portion and extending in an inclined upward direction towards the second sidewall, the third inclined portion being arranged so as to face a corner being defined by the bottom portion and the second sidewall;
a fourth inclined portion connected, at an edge of thereof, to the other edge of the third inclined portion and extending in an inclined upward direction towards the second vertical portion, the forth inclined portion being arranged so as to face the second bent portion with a space;
a first uprising portion connected to the other edge of the second inclined portion and facing the first vertical portion in a parallel manner;
a second uprising portion connected to the other edge of the fourth inclined portion and facing the second vertical portion in a parallel manner;
wherein the slide supporting member includes a plurality of balls, each ball is rotatably arranged between one of the corresponding corner and each bent portion and each inclined portion, the sliding portion of the upper rail includes the first inclined portion, the second inclined portion, the third inclined portion and the fourth inclined portion, a first lock portions are provided at the third vertical portion and the fourth vertical portion and a second lock portions are provided at the first uprising portion and the second uprising portion of the upper rail and the third lock portions are provided at the first vertical portion and the second vertical portion of the lower rail, the lock lever includes nails formed on both ends of the lock lever, the nails formed on one end of the lock lever are fitted into the first lock portion of the third vertical portion and the second lock portion of the first uprising portion and the third lock portion of the first vertical portion and the nails formed on the other side of the lock lever are fitted into the lock portions of the forth vertical portion and the second uprising portion and the lock portion of the second vertical portion.

4. A seat sliding apparatus for a vehicle according to claim 1, wherein
the slide supporting member includes balls slidably contacted both of the upper rail and the lower rail and the lower rail includes four corners defined by the three corners and a bent portion, and wherein the balls are disposed in the space sandwiched between the upper rail and the lower rail being lower than the lock portions at the four corners of the lower rail.

5. A seat sliding apparatus for a vehicle according to claim 4, wherein
the upper rail includes each inclined portion having surfaces facing the four corresponding corners.

6. A seat sliding apparatus for a vehicle according to claim 1, wherein
the lock lever has nails extending in the predetermined direction, wherein the nails of the lock lever are fitted into the first and second lock portions formed on the wall portions of the upper rail facing each other and the third lock portion formed on the wall portion of the lower rail disposed between the wall portions of the upper rail or are fitted into the lock portions formed on the wall portions of the lower rail facing each other and the lock portion formed on the wall portion of the upper rail disposed between the wall portions of the lower rail.

7. A seat sliding apparatus for a vehicle according to claim 4, wherein
the lock lever has nails extending in the predetermined direction, wherein the nails of the lock lever are fitted into the first and second lock portions formed on the wall portions of the upper rail facing each other and the third lock portion formed on the wall portion of the lower rail disposed between the wall portions of the upper rail or are fitted into the lock portions formed on the wall portions of the lower rail facing each other and the lock portion formed on the wall portion of the upper rail disposed between the wall portions of the lower rail.

8. A seat sliding apparatus for a vehicle according to claim 5, wherein
the lock lever has nails extending in the predetermined direction, wherein the nails of the lock lever are fitted into the first and second lock portions formed on the wall portions of the upper rail facing each other and the third lock portion formed on the wall portion of the lower rail disposed between the wall portions of the upper rail or are fitted into the lock portions formed on the wall portions of the lower rail facing each other and the lock portion formed on the wall portions of the upper rail disposed between the wall portions of the lower rail.

9. A seat sliding apparatus for a vehicle, comprising:
a lower rail provided at a stationary portion of a vehicle floor;
an upper rail provided at a seat of the vehicle and mounted on the lower rail so as to move relative to the lower rail;
a lock mechanism having a lock lever for releasably locking the upper rail with the lower rail;
a slide supporting member disposed between the upper rail and the lower rail and slidably supporting the upper rail relative to the lower rail;
a first sliding portion provided at the upper rail and with which the slide supporting member slidably comes in contact, and a second sliding portion provided at the lower rail and with which the slide supporting member slidably comes in contact;
a first lock portion provided at one of the upper rail and the lower rail;
a second lock portion provided at the other one of the upper rail and the lower rail facing the first lock portion, the lock lever being engageably and disengageably fitted into at least one of the first, second portions;
the first sliding portion of the upper rail being continuously formed over an entire length of the upper rail in the longitudinal direction; and
the lock portion of the upper rail being arranged entirely at one of an upper side and a lower side of the first sliding portion of the upper rail.

10. A seat sliding apparatus for a vehicle, comprising:
a lower rail provided at a stationary portion of a vehicle floor;
an upper rail provided at a seat of the vehicle and mounted on the lower rail so as to move relative to the lower rail, the upper rail extending in a longitudinal direction and possessing a length;
a lock mechanism having a lock lever for releasably locking the upper rail with the lower rail;
a slide supporting member disposed between the upper rail and the lower rail and slidably supporting the upper rail relative to the lower rail;
an inclined slide wall portion continuously formed over the entire length of the upper rail in the longitudinal direction, and the inclined side wall portion including a first sliding portion with which the slide supporting member slidably comes in contact;
a second sliding portion provided at the lower rail with which the slide supporting member slidably comes in contact;
a first lock portion and a second lock portion provided at one of the upper rail and the lower rail, the first lock portion and the second lock portion facing each other;
a third lock portion provided at the other one of the upper rail and the lower rail, the third lock portion being located between the first lock portion and the second lock portion, the lock lever being engageably and disengageably fitted into at least one of the first, second and third lock portions; and
the lock portion of the upper rail being arranged entirely at one of an upper side and a lower side of the inclined side wall portion of the upper rail.

11. A seat sliding apparatus for a vehicle according to claim 10, wherein the slide supporting member includes balls slidably contacting both the upper rail and the lower rail.

12. A seat sliding apparatus for a vehicle according to claim 10, wherein the first lock portion comprises a plurality of first holes spaced apart in the longitudinal direction, the lock lever being positionable in at least one of the first holes when the upper rail is locked in position relative to the lower rail.

13. A seat sliding apparatus for a vehicle according to claim 10, wherein the first lock portion comprises a plurality of first holes spaced apart in the longitudinal direction, the second lock portion comprises a plurality of second holes spaced apart in the longitudinal direction, the lock lever being simultaneously positionable in at least one of the first holes and one of the second holes when the upper rail is locked in position relative to the lower rail.

14. A seat sliding apparatus for a vehicle according to claim 10, wherein the first lock portion comprises a plurality of first holes spaced apart in the longitudinal direction, the second lock portion comprises a plurality of second holes spaced apart in the longitudinal direction, the third lock portion comprises a plurality of third holes spaced apart in the longitudinal direction, the lock lever being simultaneously positionable in at least one of the first holes, at least one of the second holes and at least one of the third holes to lock the upper rail in position relative to the lower rail.

15. A seat sliding apparatus for a vehicle according to claim 1, wherein the slide supporting member comprises a first ball and a second ball, the first ball being vertically higher than the second ball, the first and second balls contacting the upper rail at the first sliding portion.

16. A seat sliding apparatus for a vehicle according to claim 9, wherein the slide supporting member comprises a first ball and a second ball, the first ball being vertically higher than the second ball, the first and second balls contacting the upper rail at the first sliding portion.

17. A seat sliding apparatus for a vehicle according to claim 10, wherein the slide supporting member comprises a first ball and a second ball, the first ball being vertically higher than the second ball, the first and second balls contacting the first sliding portion of the inclined side wall portion.

18. A seat sliding apparatus for a vehicle according to claim 1, wherein the first lock portion comprises a plurality of first holes spaced apart in the longitudinal direction and the second lock portion comprises a plurality of second holes spaced apart in the longitudinal direction, the lock lever being simultaneously positionable in at least one of the first holes and one of the second holes when the upper rail is locked in position relative to the lower rail.

19. A seat sliding apparatus for a vehicle according to claim 9, wherein the first lock portion comprises a plurality of first holes spaced apart in the longitudinal direction and the second lock portion comprises a plurality of second holes spaced apart in the longitudinal direction, the lock lever being simultaneously positionable In at least one of the first holes and one of the second holes when the upper rail Is locked in position relative to the lower rail.

* * * * *